United States Patent
Bohne et al.

(10) Patent No.: US 11,142,217 B2
(45) Date of Patent: Oct. 12, 2021

(54) METHOD FOR MONITORING THE SUPPLY OF POWER TO A MOTOR VEHICLE HAVING AN AUTOMATED DRIVING FUNCTION

(71) Applicant: Robert Bosch GmbH, Stuttgart (DE)

(72) Inventors: Christian Bohne, Stuttgart (DE); Juergen Motz, Steinheim An der Murr (DE); Marco Meissner, Stuttgart (DE); Martin Andreas Lohrmann, Stuttgart (DE); Oliver Dieter Koller, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/957,439

(22) PCT Filed: Dec. 12, 2018

(86) PCT No.: PCT/EP2018/084576
§ 371 (c)(1),
(2) Date: Jun. 24, 2020

(87) PCT Pub. No.: WO2019/145087
PCT Pub. Date: Aug. 1, 2019

(65) Prior Publication Data
US 2020/0331497 A1 Oct. 22, 2020

(30) Foreign Application Priority Data
Jan. 24, 2018 (DE) .......................... 102018201119.2

(51) Int. Cl.
*B60W 50/00* (2006.01)
*B60W 60/00* (2020.01)
(Continued)

(52) U.S. Cl.
CPC ......... *B60W 60/0023* (2020.02); *B60R 16/03* (2013.01); *B60W 50/023* (2013.01); *B60W 2510/242* (2013.01)

(58) Field of Classification Search
USPC ...................................... 701/23–28
See application file for complete search history.

(56) References Cited

U.S. PATENT DOCUMENTS

| 4,361,202 A | * | 11/1982 | Minovitch | ......... B60K 31/0008 104/88.02 |
| 6,421,600 B1 | * | 7/2002 | Ross | ....................... B60L 50/51 701/117 |

(Continued)

FOREIGN PATENT DOCUMENTS

| DE | 102010026772 A1 | 1/2012 |
| DE | 102013203661 A1 | 9/2014 |

(Continued)

OTHER PUBLICATIONS

International Search Report for PCT/EP2018/084576, dated Apr. 5, 2019.

*Primary Examiner* — Jonathan L Sample
(74) *Attorney, Agent, or Firm* — Norton Rose Fulbright US LLP; Gerard Messina

(57) ABSTRACT

A method for monitoring a motor vehicle having an automated driving function. Specific operating modes are each assigned, in each instance, at least one load profile, which is a function of the load circuit needed for the operating mode and normally occurs during this operating mode. At least one characteristic quantity of the energy store is predicted as a function of the load profile. The corresponding operating mode and/or the automated driving function is enabled as a function of the predicted characteristic quantity of the energy store. The predicted characteristic quantity is ascertained as a function of a base load and/or a switching-off (Continued)

potential of the load circuit not needed for the operating mode.

15 Claims, 4 Drawing Sheets

(51) Int. Cl.
*B60R 16/03* (2006.01)
*B60W 50/023* (2012.01)

(56) References Cited

U.S. PATENT DOCUMENTS

| | | | |
|---|---|---|---|
| 8,682,550 B2* | 3/2014 | Nelson | F16H 63/50 |
| | | | 701/58 |
| 2004/0034460 A1* | 2/2004 | Folkerts | B60W 10/11 |
| | | | 701/54 |
| 2005/0109550 A1* | 5/2005 | Buglione | B60K 6/26 |
| | | | 180/65.25 |
| 2005/0234622 A1* | 10/2005 | Pillar | B60W 50/029 |
| | | | 701/41 |
| 2012/0112531 A1* | 5/2012 | Kesler | H02J 7/025 |
| | | | 307/9.1 |
| 2014/0077592 A1* | 3/2014 | Koch | B60L 58/16 |
| | | | 307/9.1 |
| 2015/0134173 A1* | 5/2015 | Choi | B60W 20/40 |
| | | | 701/22 |
| 2015/0153175 A1* | 6/2015 | Skaaksrud | H04L 65/403 |
| | | | 701/23 |
| 2018/0148044 A1* | 5/2018 | Kobayashi | B60W 20/50 |
| 2019/0210547 A1* | 7/2019 | Khafagy | B60R 16/03 |
| 2020/0051345 A1* | 2/2020 | Koller | B60W 50/02 |

FOREIGN PATENT DOCUMENTS

| | | | |
|---|---|---|---|
| DE | 102014214103 A1 | 1/2016 | |
| GB | 2328480 A * | 2/1999 | F16H 59/0204 |
| WO | 2015135729 A1 | 9/2015 | |
| WO | 2018077658 A1 | 5/2018 | |

* cited by examiner

METHOD FOR MONITORING THE SUPPLY OF POWER TO A MOTOR VEHICLE HAVING AN AUTOMATED DRIVING FUNCTION

FIELD

The present invention relates to a method for monitoring the supply of power to a motor vehicle having an automated driving function. In the method, in particular, safety-related functions of the vehicle electrical system are monitored.

BACKGROUND INFORMATION

The vehicle electrical system has the task of supplying power to the electrical load circuits. If, in today's vehicles, the supply of power fails due to a fault or ageing in the vehicle electrical system and/or in an electrical system component, then important functions, such as the power steering, are lost. Since the steerability of the vehicle is not impaired, but only becomes sluggish, the failure of the vehicle electrical system in production vehicles today is generally accepted, since the driver is available as a backup. In order to increase the availability, two-channel electrical system layouts are provided, such as described in PCT Application No. WO 2015/135729 A1. These are also needed, in order to power systems for highly automatic or fully automatic vehicle operation in a fault-tolerant manner.

In order to be able to predict the failure of components, reliability-engineering approaches have been worked out for monitoring vehicle components. To that end, the vehicle electrical system components are monitored during operation, and damage to them is ascertained. Such a method is described, for example, in German Patent Application No. DE 10 2013 203 661 A1. Electrical power, which may be provided by chemical storage batteries, is needed for the reliable support of a vehicle traveling automatically. However, chemical storage batteries have the characteristic of continuously ageing and decreasing in performance. For reliable operation, they must either be highly overdimensioned or replaced in short intervals.

An object of the present invention is to increase the reliability and, at the same time, the availability of automated driving functions and of the required supply of power. This object may be achieved in accordance with example with example embodiments of the present invention.

SUMMARY

In accordance with an example embodiment of the present invention, since a predicted characteristic quantity of an energy store may be ascertained, the availability of automated driving functions may be increased further. This characteristic quantity of the energy store is a strong function of a base load and/or of a switching-off potential of a load circuit not required for an operating mode to carry the vehicle over to a safe state. In particular, energy-intensive functions or load circuits functioning properly do not affect the enabling of automated driving functions. For, it may now be assumed that these load circuits may safely be switched off as required, so that the total electrical energy or power for a suitable operating mode to carry the vehicle over into a safe state, is available. In particular, various, different operating modes may be defined by determining the current and/or minimum possible, electrical base load within the scope of the switching-off potential. Prior to the enabling of, and during, the automated driving functions, it is checked if, in the case of a fault in the other respective, independent electrical system channel (or supply of power by a further power consumer), the energy store may power at least one or all possible operating modes, without the predicted parameter, for example, the supply voltage in the vehicle electrical system, falling impermissibly low. This result may then be signaled back to the control software of the automated driving functions, and in the case of a fault, only a reduced operating mode (with regard to a lower loading or load profile) may optionally be run. To this end, for example, evasive maneuvers could be omitted, and/or as an alternative, the rate of the automated driving function of reaching a safe operating state could be reduced. Even in the case of a slightly ageing energy store, the automated driving functions may now still be allowed, but the current load from the actuators and control units may be limited to the extent permissible from the point of view of the energy store.

In one useful further refinement of the present invention, the load profile is assigned at least one parameter characteristic of the load profile; the predicted characteristic quantity being ascertained as a function of the parameter. This simplifies the data processing, in that only one or a few parameters must be transmitted, for example, to a battery sensor, in which the action of predicting the characteristic quantity takes place. This simplifies the corresponding transmission protocols. Even the predictors themselves may be simplified. At least a time span of a duration of the operating mode and/or a maximum value of the load profile and/or a time of occurrence of a maximum value of the load profile are used as parameters in a particularly expedient manner. These variables sufficiently describe the expected power demand that the prediction takes into account. Consequently, a compromise is made between a low number of parameters to be transmitted and the accuracy of the expected load profile.

In one useful further refinement of the present invention, at least one further, predicted, characteristic quantity of at least one further energy store is ascertained in view of a further load profile, which is a function of a further load circuit that is needed for the operating mode and is powered by the further energy store. Thus, alternative electrical system branches may be evaluated with regard to their operability for executing particular operating modes. The automated driving functions may be enabled, when at least one operating mode for bringing the vehicle into a safe state may be executed safely. This, in turn, increases the availability of the automated driving functions.

In one useful further refinement of the present invention, at least one electronic load distribution element is provided for controlling the load circuits and/or for sensing their current. Especially in an electronic load distribution element, it is ensured, in particular, that load circuits not needed for the operating mode may be switched off in a safe manner, thereby further increasing the reliability of the overall system. In addition, such standard electronic circuit breakers are able, for example, to measure the load current flowing and, therefore, to deduce the level of the base load and/or the switching-off potential of the respective load. This increases the accuracy of the prediction. The availability of the overall system may be increased further.

In one useful further refinement of the present invention, the vehicle electrical system is excited to ascertain the battery condition, in particular, by activating at least one load circuit and/or at least one source and/or a load connected through an electronic circuit breaker. This improves the quality of the prediction and/or actually renders it possible. If, for example, the measurement of particular characteristic quantities of the energy store, which, in turn, may have an influence on the prediction, was done a long time ago and is therefore no longer representative, then an up-to-date determination of certain characteristic quantities may be carried out by exciting the vehicle electrical system in a concerted manner. This increases the reliability of the overall system.

Other useful further refinements of the present invention may be derived from the description herein and the figures.

DETAILED DESCRIPTION OF EXAMPLE EMBODIMENTS

The present invention is represented schematically in the figures in light of specific embodiments, and is described below in a detailed manner with reference to the figures.

In the exemplary embodiments described herein, a battery or accumulator is described, by way of example, as a possible energy store. As an alternative, however, other energy stores suitable for this defined task, for example, on an inductive or capacitive basis, fuel cells, capacitors, or the like, may equally be used.

Figure 1:
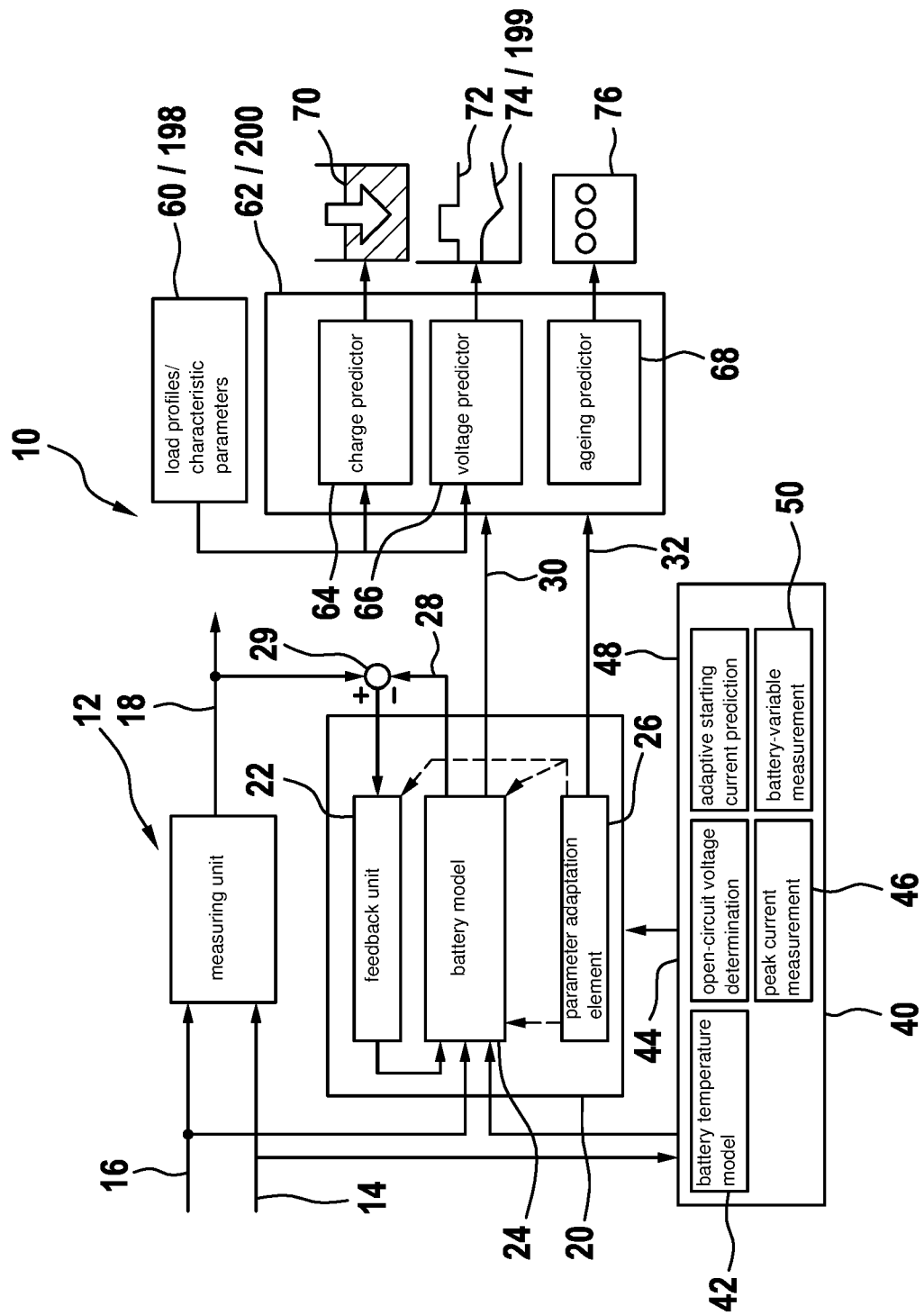
FIG. 1 shows a battery sensor for predicting a characteristic quantity.

FIG. 1 shows a battery sensor or part of a battery management system, which is denoted, on the whole, by reference numeral 10. Input variables in a unit 12, in particular, a measuring unit, include temperature 14 and current 16. The output variable is a voltage 18.

Parameters and states are estimated in a block 20. A feedback unit 22, a battery model 24 and a parameter adaptation element 26 of the parameters are provided in this. A voltage 28, battery state variables 30 and battery model parameters 32 are outputted.

A node 29 is used for adapting battery model 24 to the battery. Current 16 has a direct influence and temperature 14 has an indirect influence on battery model 24. This calculates variable 28, for example, a voltage, based on battery model 24, and compares this to actual voltage 18. In response to differences, battery model 24 is corrected via a feedback unit 22.

In addition, a block 40 for sub-algorithms is provided. This includes a battery temperature model 42, an open-circuit voltage determination element 44, a peak current measurement element 46, an adaptive starting current prediction element 48 and a battery-variable measurement element 50.

In addition to that, load profiles 60, e.g., also in the form of characteristic parameters 198, as described below, are also provided, which have influence on a block 62 that includes predictors. These include a charge predictor 64, a voltage predictor 66 and an ageing predictor 68. Outputs of block 62 include a signal Q_pred, which is used for ascertaining a state of charge (SOC) 70, the predicted voltage U_pred (74, 199) as a function of load current 72 (I), and an ageing prediction value, which is used for ascertaining state of health (SOH) 76 of the battery, as possible, predicted, characteristic quantities of the energy store.

Using predictors 64, 66, 68, battery sensor 10 is able to forecast or predict SOC 70, the voltage dip of predicted voltage 74/199 and SOH 76 during and after a plurality of previously defined load scenarios. These may now be adapted to automated driving and/or to the specific application case. In particular, using a typical loading operation (with the aid of certain load profiles 60, 141 and/or parameters 198 characteristic of them) of a corresponding operating mode (215, SSL 1, SSL 2, SSL 3), predictors 64, 66, 68 are capable of bringing a vehicle to a dead stop and predicting at least one particular characteristic quantity of battery 106, 110 (forecasting it with the aid of a simulation). Different operating modes (SSL 1, SSL 2, SSL 3) are provided, in order to bring the vehicle to a dead stop and consequently attain a safe operating state (safe stop level) of the motor vehicle. In each instance, each of these different operating modes (SSL 1, SSL 2, SSL 3) is assigned a load profile 141/198. For specific load 198, the battery state resulting from it is simulated, and its effects on the predicted characteristic quantity of battery 106, 110 (such as, for example, voltage, current, SOC, SOH, SOF (state of function (SOF) describes the capacity of the battery and provides information about the power output, at which the energy store may power the load circuit) are predicted. If load profile 60, 141 in the simulation results in the characteristic quantity (for example, predicted voltage 74/199) falling below certain limiting values, then the specific operating mode SSL linked to simulated load profile 141 is blocked. As explained below in further detail, load profiles 60, 141 may be conveyed to battery sensor 10 via a few parameters 198.

Figure 2:
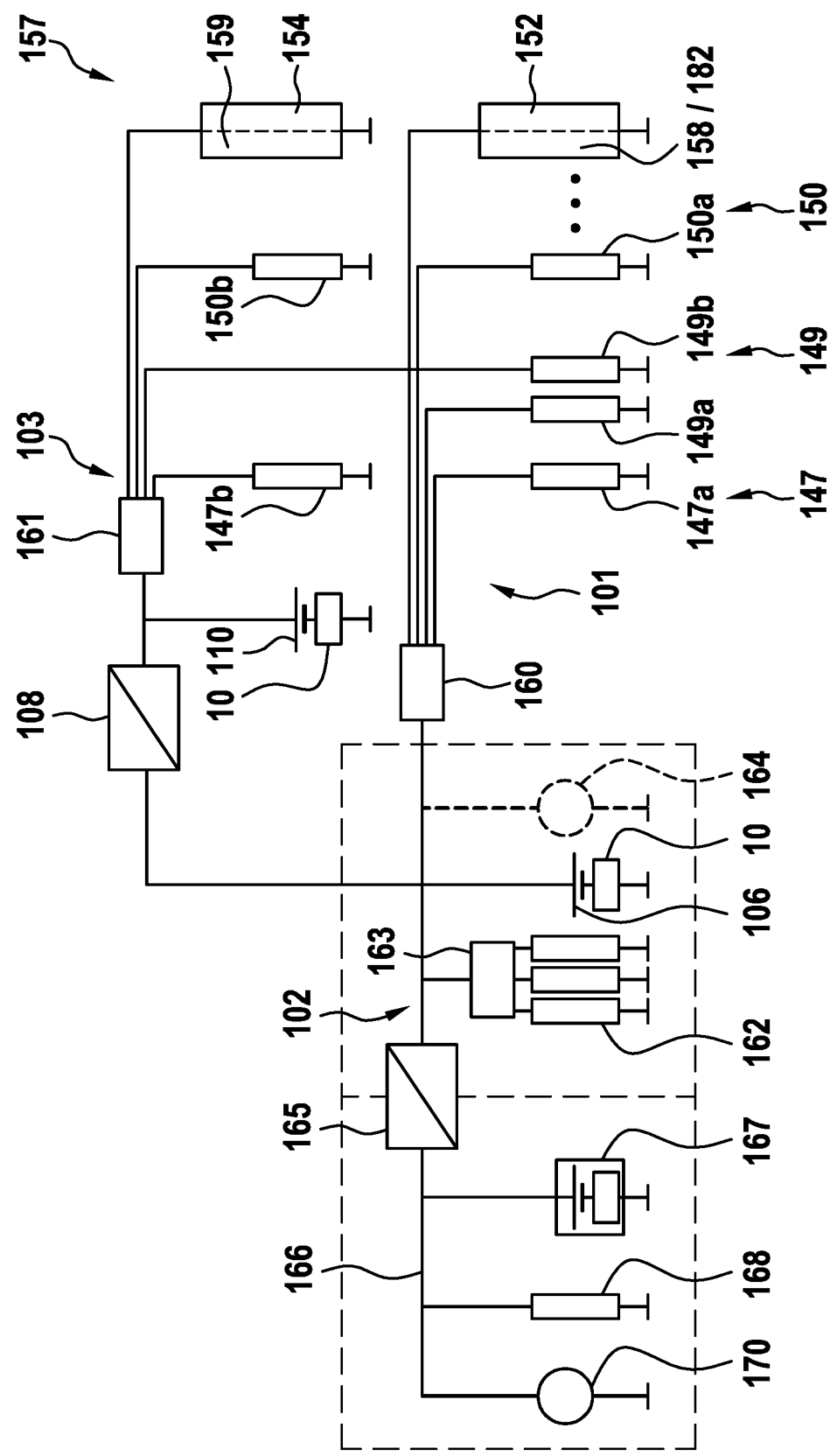
FIG. 2 shows a possible electrical system of a vehicle for automated driving.

FIG. 2 shows a possible topology of a power supply system, made up of a base vehicle electrical system 102, which includes a battery having a corresponding battery sensor 10, a starter 164, and a plurality of non-safety-related comfort load circuits 162, which are protected and/or controlled by an electric load distribution element 163. Base vehicle electrical system 102 has a lower voltage level than a high-voltage vehicle electrical system 166; for example, it may be a 14 V electrical system. A d.c. voltage converter 165 is positioned between base vehicle electrical system 102 and high-voltage vehicle electrical system 166. High-voltage vehicle electrical system 166 includes, by way of example, a high-voltage battery 167 possibly having an integrated battery management system, a non-safety-related load 168 or comfort load circuit exemplarily shown, such as an air conditioning system, etc., as well as an electrical machine 170. In this connection, high-voltage is to be understood as a voltage level, which is greater than the voltage level of base vehicle electrical system 102. Thus, it could be, for example, a 48-Volt vehicle electrical system. As an alternative, in particular, in the case of vehicles having an electrical drive, it may be even higher voltage levels. Alternatively, high-voltage vehicle electrical system 166 could be omitted completely.

Two safety-related channels 101, 103 are connected to base vehicle electrical system 102. First safety-related channel 101 is connected to base vehicle electrical system 102 via an electronic load distribution element 160. Electronic load distribution element 160 is used for protecting, controlling, and safely and reliably switching off safety-related load circuits 147a, 149a, 150a, 152, that is, the electronic power network distribution. In addition, electronic load distribution element 160 may be able to measure the flowing load-circuit currents.

Further safety-related channel 103 is connected to base vehicle electrical system 102 via both a d.c. voltage converter 108 and a further electronic load distribution element 161. A further battery 110 connected to ground is positioned between d.c. voltage converter 108 and electronic load distribution element 161. A further battery sensor 10 is also set up for further battery 110, the further battery sensor being for measuring typical characteristic quantities of further battery 110. By way of example, the voltage level of further battery 110 may be the voltage level of base vehicle electrical system 102. It may be 14 V, for example. Alternative voltage levels are conceivable. Electronic load distribution element 161 in further channel 103 is used for protecting, controlling, and safely and reliably switching off, in particular, safety-related load circuits 147b, 149b, 150b, 155, 159. In addition, electronic load distribution element 161 may measure possible load-circuit currents. D.c. voltage converter 108 allows an exchange of energy between further battery 110 and base vehicle electrical system 102, and optionally with high-voltage vehicle electrical system 166 via further d.c. voltage converter 165. Consequently, it may be ensured that batteries 106, 110 may power safety-related load circuits 147, 149, 150, 157 reliably via safety-related channels 101, 103.

The redundant, in particular, functionally redundant, safety-related load circuits 147, 149, 150, 157 capable of being powered via the two safety-related channels 101, 103 are ones, which are necessary for carrying a vehicle over from automated vehicle operation (no action by the driver necessary) to a safe state in, for example, the case of critical faults. As described below in further detail, it may be stopping the vehicle, be it immediately, be it at the edge of the roadway, or be it only at the next rest area, etc.

In the exemplary embodiment according to FIG. 2, the following safety-related load circuits are provided. In this case, at least a brake system 147 is involved. The brake functionality may either be achieved by a first component 147a (for example, a so-called iBooster, which generates the brake pressure electromechanically), which is powered via the one safety-related channel 101. Alternatively, the redundant brake functionality is achieved by a further component 147b. For example, a so-called electronic stability program, which may also bring the vehicle to a dead stop, may be used as a further component 147b. Further component 147b is powered via further safety-related channel 103 and controlled by electronic load distribution element 161.

For example, a steering system 149 is provided as a further safety-related component. Steering system 149 is made up of a first component 149a, which may be controlled and powered by first safety-related channel 101 via electronic load distribution element 160. In addition, steering system 149 includes a further component 149b, which may also steer the vehicle in a desired manner, independently of first component 149a. Further component 149b is controlled and/or powered via the further electronic load distribution element 161 for further safety-related channel 103.

A human-machine interface 150 (user interface) is provided as a further, possible safety-related component. This human-machine interface is, in turn, made up of two components 150a, 150b operable independently of each other. The one component 150a is controlled and/or powered by electronic load distribution element 160 via first safety-related channel 101. Further component 150b is controlled and/or powered by further safety-related channel 103 and/or corresponding electronic load distribution element 161.

An automated driving function 157 is provided as a further safety-related component. Alternatively, in each instance, a group of sensors and a processing control unit, which controls the actuators, could be provided in block 157. Automated driving functions 157 are constructed, in turn, to be redundant. Thus, a first processing unit 152 (first processing unit 152 could correspond to the central processing unit 182 shown in FIG. 3), as well as a first sensor unit 158, are controlled and/or powered by first channel 101, that is, by corresponding electronic load distribution element 160. Automated driving functions 157 may be implemented in a redundant manner by a further processing unit 154 and one or more sensor units 159, which are controlled and/or powered by further safety-related channel 103 or corresponding, further electronic load distribution element 161. For example, the trajectory planning, including associated control values for the necessary actuators, takes place in processing units 152, 154. Sensor units 158, 159 each provide the current surrounding-area data of the vehicle for the trajectory planning.

Figure 3:
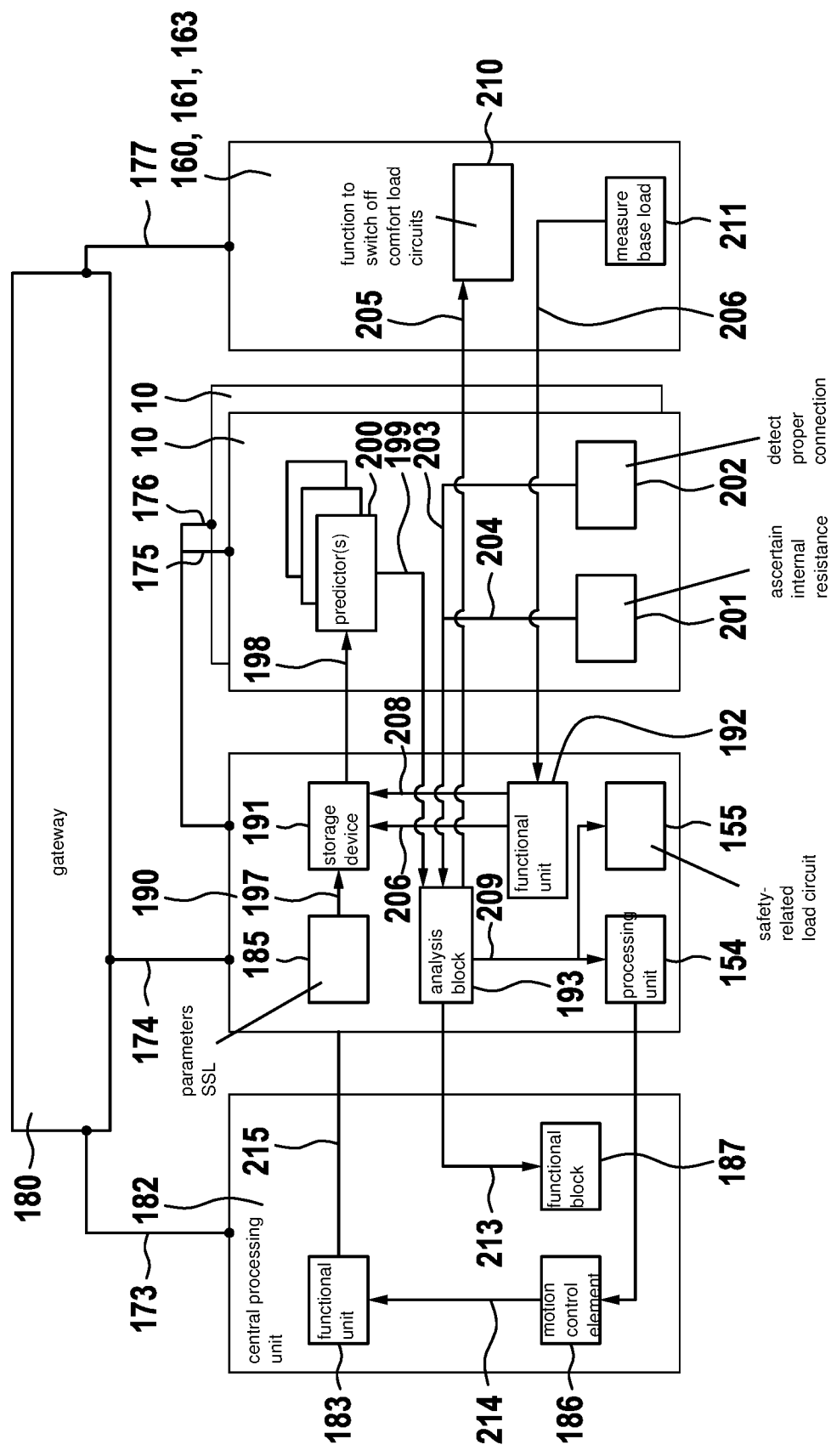
FIG. 3 shows a general plan of different control units with regard to networking and functional overview.

The networking of the control units and a functional overview are shown in FIG. 3. A central processing unit 182 (central processing unit 182 could correspond to processing unit 158 shown in FIG. 2) for automated driving exchanges data with a gateway 180 via a data transmission circuit 173. Data transmission circuit 173 may be, for example, an Ethernet connection.

A control unit 190 exchanges data with gateway 180 via a further data transmission circuit 174. Further data transmission circuit 174 may be, for example, a CAN bus. Controls of the vehicle electrical power system functions and/or of the energy management are provided in control unit 190. The energy management monitors and controls the power distribution in the vehicle electrical system. Depending on load conditions, for example, in response to an imminent power bottleneck, certain loads or load circuits categorized as low-priority may be switched off and/or not activated in spite of a corresponding request. Thus, for example, the typical power demands of the respective load circuits in response to planned activation are stored or ascertained in the energy management. Alternatively, instead of in control unit 190, the functions of the energy management could also be implemented in d.c. voltage converter 108, 165 shown in FIG. 2, or else in another control unit (for example, in the load circuits 162) in the vehicle. As an alternative, it would also be possible to implement these functions regarding the energy management of vehicle electrical system 102, 166, in central processing unit 182 or in gateway 180.

In addition, by way of example, two battery sensors 10 are provided, as already described in connection with FIG. 1. The one battery sensor 10 exchanges data with control unit 190 via a data transmission circuit 175. The other battery sensor 10 exchanges data with control unit 190, as well, via a further data transmission circuit 176. Data transmission circuits 175, 176 may be, for example, a so-called LIN bus. Specific battery sensors 10 are positioned on associated batteries 106, 110, for example, at their poles. As described in detail already, or in the following, further functions are stored in battery sensors 10. A function 201 for ascertaining an internal resistance and/or a function 202 for detecting a proper connection of the energy store, that is, battery 106, 110, with vehicle electrical system 102, 166 are shown by way of example. In addition, a predictor 62, 200 is provided in each battery sensor 10; as described, the predictor predicting certain characteristic quantities, in particular, the voltage, as a function of particular load profiles 141, possibly plotted versus certain parameters 198. To this end, the battery sensor receives suitable parameters 60, 198 from control unit 190. Battery sensor 10 transmits, in turn, certain data, such as predicted characteristic quantities 74, 199, to control unit 190.

Furthermore, at least one electronic load distribution element 160, preferably, further load distribution elements 161, 163, are provided. Electronic load distribution element 160, 161, 163 communicates with gateway 180, that is, with the control unit 190 and/or central processing unit 182, 152 connected to it, via a further data transmission circuit 177. For example, a CAN bus could be provided as a further data transmission circuit 177. Electronic load distribution element 160, 161, 163 is positioned, for example, in front of non-safety-related comfort load circuits 162, in order to activate/deactivate them. In principle, these electronic load distribution elements 160, 161, 163 may control safety-related loads, in particular, those that are necessary for carrying the vehicle over into a safe state, as described already in connection with FIG. 2. A function 210 for switching off comfort load circuits 162 is indicated systematically in electronic load distribution element 160. In addition, in electronic load distribution element 160, 161, 163, a function 211 for measuring a base load 206 may be implemented in electronic load distribution element 160.

In principle, as already described, the control units, such as central processing unit 182, 152, control unit 190, battery sensors 10, as well as electronic load distribution elements 160, 161, 163, are interconnected via Ethernet, CAN bus or LIN bus for the purpose of exchanging data. As shown in FIG. 3, a gateway 180 or a control unit having a gateway function is normally connected between them. Furthermore, additional control units, which are not shown, are present in the vehicle. Different functions are partitioned on the control units shown in FIG. 3, the functions being represented by the different blocks and connected by the signal paths shown.

In one block, central processing unit 182, 152 includes a motion control element 186 for the vehicle. In motion control element 186, the planned trajectories are converted to corresponding control commands for the actuators situated in the vehicle. For example, appropriate steering commands in the form of steering angle setpoints are inputted for steering system 149, and/or appropriate braking maneuvers are selected for brake system 147. Appropriate motion control elements 186 for the different operating modes SSL are also stored in the block, in order to reach a safe state. Motion control element 186 converts corresponding trajectories of different operating modes SSL for attaining a safe state, to control commands 214 for the actuators, and provides them to a functional unit 183 for attaining a safe operating state.

In central processing unit 182, 152, for example, functional unit 183 is intended for achieving a safe stop or safe state. To reach a safe stop, the manner, in which, in the case of a fault, the vehicle is supposed to be brought into the safe state in an automated manner, is stored or inputted in functional unit 183. For example, that the vehicle is to be decelerated immediately, is stored in a first operating mode SSL 1. Alternatively, that the sensors (for example, in one of sensor units 158, 159) shall monitor the further path of the lane, and that the vehicle shall follow this path of the lane, using steering system 149, and that the vehicle shall be stopped in the lane, may be stored. In addition, that the vehicle should be brought to a stop by the next rest area or on the hard shoulder, may be stored. It may also be, that, in the case of the same automatic driving functions, different operating modes SSL may be run as a function of the fault case, in order to achieve a safe state. In the exemplary embodiment, there are three different operating modes SSL 1, SSL 2, SSL 3 per (electrical system) channel 101, 103, which differ, in particular, in the need for electrical energy, performance and duration. The different, specific operating modes SSL are assigned normal load profiles 141, which reflect, for example, the curve of the current or the power of one or more load circuits and/or actuators, which are involved in the special operating mode SSL during the transition into the safe state. To this end, different operating modes SSL are stored in functional unit 183 so as to have different power demands, in particular, having little power output (light), having a medium power demand (typical power demands), and having a high power demand (so-called worst-case maneuver).

In a first operating mode SSL 1 for attaining a safe state, for example, brake pressure is built up slowly for low deceleration and stopping in the lane. Due to the short duration tmax, this scenario requires little energy, that is, little electrical power, since no dynamic driving maneuver is executed.

In a second operating mode SSL 2, for example, a buildup of pressure, ABS control, and stopping in the lane may take place. The duration tmax of the maneuver is also quite short, but more energy is required for the brake pressure modulation. In addition, due to the pressure modulation, for example, in the case of an electronic stability program 147a, current spikes occur, in which the energy store or battery 106, 110 must provide a short-term, high power output.

In a third operating mode SSL 3, in the case of a fault, for example, a driver handover for a certain time span of, e.g., 10-15 seconds is triggered. According to that, dynamic lane changes occur, including actions for stabilizing and for decelerating the vehicle to a stop. This operating mode has the highest demand regarding energy and power consumption. Due to the dynamic driving maneuvers, electric steering system 149 and electric brake system 147 may simultaneously require a high electric power output. This high current loading may lead to critical voltage dips, through which safety-related load circuits may no longer be powered properly. In general, however, many other and also markedly different operating modes for carrying the vehicle over into the safe state are conceivable. In principle, however, the different operating modes SSL should be generalized and clustered with regard to energy and power demand.

The data 215 of the so-called safe-stop maneuvers of functional unit 183 relevant to operating modes SSL are transmitted to a block 185 "parameters SSL." This block 185 is preferably situated in control unit 190. An advantage of this variant is that the energy management functions, as situated in control unit 190, know the power demand of the load circuits to be powered, markedly better than, for example, central processing unit 182 and 152. Operating modes SSL for carrying the vehicle over into a safe state may change on the basis of a functional update or on the basis of changed environmental conditions. Several operating modes SSL per channel or electrical system branch 101, 103 are stored, as described, in functional unit 183.

In general, only certain parameters 197 of load profiles 141 of the different operating modes SSL for each channel are transmitted to control unit 190, in particular, to the energy management.

These particular parameters 197, which reflect the load profiles 141 in typical operating modes SSL in simple form, are ascertained and/or stored in block 185 "parameters SSL." Particularly preferably, the maximum time characteristic of the power demand (duration of specific operating mode SSL) tmax and/or a maximum power or other characteristic quantity (for example, current I) of the specific load circuit or actuator involved in corresponding operating mode SSL Pact1, Pact 2, . . . and/or the time of occurrence tact1, tact2, . . . of this maximum power or other characteristic quantity, are used as parameters 197. The parameters 197 ascertained in this manner are made available to storage device 191 of control unit 190.

Thus, parameters 197 include, for example, a maximum characteristic quantity, for example, a maximum power Pact1 or a peak current Iact1, of actuator 1 at time tact1. Worded generally for an actuator actn, one of parameters 197 is a maximum characteristic quantity Pactn, Iactn of actuator actn at time tactn of the occurrence of this maximum characteristic quantity Pactn, Iactn (maximum of the time characteristic of the characteristic quantity and/or of load profile 141 within time span tmax) for the specific channel Ch1, Ch2, Chn or electrical system branch 101, 103. In addition, the maximum duration (tmax), per channel, of specific operating mode SSL is stored or ascertained by calculation in block 185. In addition, how the current status of the automatic driving functions is (for example, active/inactive/waiting for enabling), and/or if a request regarding the enabling of the automated driving functions is present, may be stored or ascertained by calculation in block 185. These data are also to be understood as parameters 197. These parameters 197 are transmitted completely or only partially to control unit 190, preferably, to the energy management. Parameter 197 could also include the status of the automated driving functions. Likewise, within the scope of parameters 197, a request for enabling the automated driving functions could be transmitted, which could start the subsequent testing procedures. Some of parameters 197 may also be taken from the FIG. 4 explained below in a brief manner.

Figure 4:
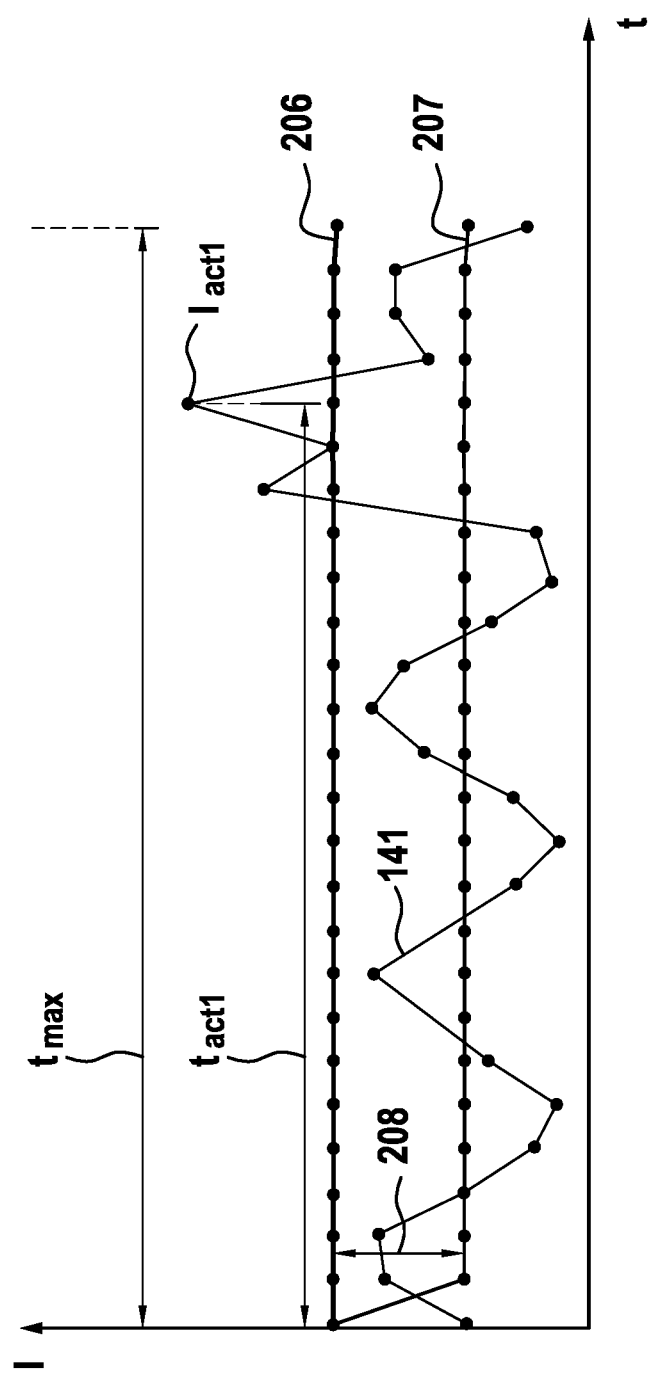
FIG. 4 shows the time characteristic of the current of comfort-related and safety-related load circuits and the derivation of corresponding parameters resulting from it.

FIG. 4 illustratively shows the time characteristic of current 206 of comfort load circuits 162 and safety-related load circuits 147, 149, 157, as well as a current characteristic as an example of a typical load profile 141 of an actuator act1 for a particular operating mode SSL. The current base load 206, as is ascertained by the energy management and possibly supplied to battery sensor 10, is drawn in. Base load 206 has, by way of example, a constant current value. The decreased base load 207, to which a reduction may be made, if necessary, is also drawn in. The difference between current base load 206 and reduced base load 207 is drawn in as switching-off potential 208. Switching-off potential 208 takes into account that the load circuits, which are not necessarily needed for specific operating mode SSL and are, thus, as a rule, comfort load circuits 162, may be switched off. At a time tact1, actuator act1 attains its maximum value or maximum characteristic quantity, in the exemplary embodiment shown in FIG. 4, maximum current Iact1. Also drawn in, is maximum period of time tmax for executing corresponding operating mode SSL 1, from the start of operating mode SSL at time t=0 to its end, when the vehicle has been carried over into a safe operating state. Depending on the maneuver, the magnitude of maximum period of time tmax is on the order of a few seconds to several minutes.

As shown in FIG. 3, a functional unit 192 for ascertaining the base load is implemented in control unit 190, preferably, in the energy management. For example, parameters for power consumption may be stored, in order to ascertain the base load in vehicle electrical system 102 due to both safety-related and other (non-safety-related) load circuits 162 or comfort load circuits, such as heating, air conditioning or other comfort functions. Alternatively, it is possible for electronic load distribution element 163 to measure the current of one or more load circuits 162 in a block 211 and to provide it as data 206 (current base load) to functional unit 192 for ascertaining the base load. Alternatively, corresponding power data could also be acquired in the load circuits themselves and transmitted to control unit 190. Both parameters 197 of different operating modes SSL and/or ascertained base load 206 and/or corresponding switching-off potential 208 are stored and possibly processed further in a block 191. In addition, control unit 190 may ascertain how markedly base load 206 may be reduced, as needed, by electronic load distribution element 163 (switching-off potential 208). To this end, for example, load circuits, in particular, comfort load circuits 162, which are activated at the moment but may be switched off, are ascertained along with the associated power consumption. In particular, when using electronic load distribution elements 160, 161, 163, it may be reliably assumed that electronic load distribution element 163 may reliably and safely reduce base load 206 in the vehicle by a certain amount (switching-off potential 208). If operating mode SSL for transitioning into a safe state is actually executed, then control unit 190, in particular, the energy management, activates the switching-off of comfort load circuits 162, using appropriate commands to electronic load distribution element 163 in accordance with ascertained switching-off potential 208.

Electronic load distribution element 163 also has, inter alia, the task of switching off the base loads or comfort load circuits 162 with a goal of safety. Using an appropriate current measurement and/or a functional block 211 for determining base load 206, this is communicated to control unit 190, preferably, to the energy management. In the case of a corresponding prediction of the characteristic quantity (for example, predicted electrical system voltage U 74, 199, using reduced base load 207 and load profile 60, 198), it may be assumed that these loads or load circuits 162 may be switched off during corresponding operating mode SSL 1, SSL 2, SSL 3, in order to attain a safe state. This increases the availability of the automated driving functions.

From current base load 206 and switching-off potential 208, control unit 190 ascertains the reduced base load 207, which will be present, at a maximum, during time tmax of specific operating mode SSL for attaining a safe state. Maximum duration tmax of specific operating mode SSL, the corresponding, reduced base load 207 during this time, and the maximum power requirement of the actuators Iact1, Iactn necessary for specific operating mode SSL at specific time tact1, tactn are stored in a memory block 191 and are transmitted to at least one predictor 200, 62 of a battery sensor 10, and depending on demand, also to further battery sensors 10 and/or corresponding predictors 200, 62 for respective channels 101, 103. In the exemplary embodiment according to FIG. 3, memory block 191 is implemented in control unit 190.

Normally, for each channel 101, 103 (or Ch1, Ch2, . . . ) having the respective safety-related actuators and/or load circuits 147a, 149a, 150a, 152, 158; 147b, 149b, 150b, 154, 159 powered by this channel 101, 103, a separate predictor 62, 200.1, 62, 200.2 is applied for each operating mode SSL. A plurality of predictors 62, 200 may also be provided simultaneously. The result of a predictor 62, 200 is a predicted characteristic quantity, for example, the calculated, minimum voltage dip (UpredSSL, corresponding parameters 199, 74) at the battery terminal, caused by the given current characteristic or load characteristic 141 of corresponding operating mode SSL. In addition, a confidence interval of predicted characteristic quantity (UpredSSL, 74/199) is outputted. In order to be able to predict the expected characteristic quantity, many additional state variables of battery 106, 110 are necessary, such as state of charge SOC, state of health SOH, internal resistance Ri (compare block 201), or the like. These are calculated inside battery sensor 10, as described.

Simultaneously to the prediction of the characteristic quantity (for example, voltage 74/199 or the voltage dip) during specific operating mode SSL, internal resistance Ri is also calculated (block 201) as a characteristic quantity 204 of respective battery 106, 110 and likewise outputted with a corresponding confidence interval. In addition, battery-off detection runs in a functional block 202. An algorithm stored in this functional block 202 detects if the connection of battery 106, 110 to battery sensor 10 and/or to vehicle electrical system 102 is broken.

Each of these variables is transmitted separately for each channel 101, 103 and separately for each operating mode SSL, to an analysis block 193. In this analysis block 193, an analysis takes place as to, at which limits of the predicted characteristic quantity (for example, voltage limits) a safety-related load circuit 147, 149, 157 may only just be degraded (for example, operated at a lower power) or does not function at all; that is, up to which value the predicted characteristic quantity, such as the voltage, may dip in channel 101, 103 and/or at the input terminal of safety-related load circuit 147, 149, 157, without the safety-related functions dropping out. These limiting values are compared to the predicted characteristic quantities. If it is predicted that, on the basis of the state of the corresponding battery 106, 110, certain safety-related functions may no longer be run, since, according to the prediction, the characteristic quantity (for example, the voltage) would dip too low, the corresponding status information (status bit Status BN1) for specific operating mode SSL is set to 0 (respective SSL not permitted). In this case, the automatic driving function is only enabled in a limited manner. However, when all operating modes SSL for attaining a safe state may no longer be powered by battery 106, 110 (all of the states Status BN1 (or BN2) for all operating modes SSL not permitted), without the predicted characteristic quantity falling excessively, the full, automatic driving function is completely blocked by a functional block 187 regarding the enabling. The corresponding status information of analysis block 193, which has been generated there, is transmitted accordingly to central processing unit 182, 152, that is, to functional block 187 of central processing unit 182, 152. The same is true for status information items 213 (Status BN 1, Status BN 2 for specific operating modes SSL 1 . . . n) for the respective, individual operating modes SSL, if these are permissible in light of the predicted characteristic quantities.

In addition, the test run implemented in analysis block 193 may also be executed, if the automatic driving function is already in operation. In this case, somewhat more severe (that is, higher) limiting values, such as voltage limits, could be stored for analysis block 193, in order to prevent the automatic driving functions from being enabled, although battery 106, 110 is close to the permissible power limit. For example, analysis block 193 is implemented in control unit 190.

Furthermore, it is possible for no load circuit 147, 149, 150, 157, 162 to have been active in a channel 101, 103 for a long time, and, consequently, for battery 106, 110 to not have received any loading through current delivery or current consumption. In this case, the validity of the result is set back by respective predictor 200, 62 (e.g., validity=0), since battery 106, 110 has no longer been able to be diagnosed for a certain period of time. Consequently, the time of the last battery diagnosis is actively monitored and, in some instances, evaluated to discern the validity, as described. Electrical excitation may be produced by having load circuits 147, 149, 150, 157, 162 be switched on by control unit 190 (energy management) and by an electronic load distribution element 160, 161, 163. This is accomplished through block 194, which is used for exciting (battery 106, 110 and/or vehicle electrical system 102), e.g., via load circuits. Alternatively, a source (for example, a d.c. voltage converter 108, 165 according to FIG. 2) could feed more power into specific channel 101, 103 of vehicle electrical system 102 or extract it from channel 101, 103. This functionality is accomplished by a block 195, which is used for excitation via a source. The two blocks 194, 195 are implemented, by way of example, in control unit 190. In the case of a lack of validity, then, in addition to d.c. voltage converter 108, 165, excitation could also be accomplished via a generator or further actuators.

In one alternative embodiment that is not shown, the block 185 for storing the parameters of different operating modes SSL is partitioned by control unit 190 (energy management) in central processing unit 182, 152. This means that corresponding operating modes SSL are generated in central processing unit 82, 152, and that in addition, the conversion to electrical operating variables takes place in central processing unit 182, 152, as well.

In one alternative specific embodiment, not only voltage dips (predicted characteristic quantities fall below certain limiting values), but also exceedance of limiting values (for example, excessive voltages) are predicted, which may occur in response to feedback into a non-buffering battery 106, 110.

It is particularly preferable for control unit 190 to be configured to ascertain at least a base load 206 and/or a switching-off potential 208 of the load circuit 162 not needed for operating mode SSL; control unit 190 being configured to receive the predicted characteristic quantity; control unit 190 being configured to ascertain an enabling information item for specific operating mode SSL as a function of the predicted characteristic quantity.

In summary, the following steps are executed. The different operating modes SSL for attaining a safe state are defined for each channel or electrical system branch 101, 103, including corresponding actuators, control units and associated load profiles 141; block 183.

Parameters 197, 60 derived, inter alia, from load profiles 141 of different operating modes SSLCh1(1 . . . n); SSLCh2(1 . . . n) for respective electrical system branches 101, 103 (Ch1, Ch2) are stored in block 185 and/or are transmitted to control unit 190. As an alternative, they could be formed in block 185, that is, in control unit 190. Parameters 197, 60 are transmitted to block 191 of the energy management or control unit 190. Parameters 197 are stored in block 191 of the energy management. These parameters and possibly further ones are normally transmitted to battery sensor(s) 10 in the form of parameters 198. In addition, the energy management or control unit 190 ascertains actual base load 206 and/or switching-off potential 208 for each channel Ch1, Ch2 or electrical system branch 101, 103 and transmits it to battery sensor(s) 10, as well. Therefore, these signals correspond to load profile 60, 198.

Based on current battery state variables, the battery sensor 10 in question predicts corresponding voltage curves 74, 199 for each of the operating modes SSL of specific channel or electrical system branch 101, 103. Battery sensor 10 outputs the predicted voltage dip and/or the predicted characteristic quantity (as part of the parameters 199 ascertained by battery sensor 10) at energy store 106, 110, that is, the battery. In addition, the confidence interval for each predictor 62, 200 is outputted. A confidence interval is an interval from the field of statistics, which is supposed to indicate the accuracy of the estimate of a state of a parameter. The results of predictors 62, 200 become more unclear or more precise as a function of the previous history of energy store 106, 110, the current state, and/or the present or preceding excitation. Furthermore, a statement regarding the validity of the result is made. Thus, the validity of the result may expire, if the excitation of the electrical system was overly long ago and fresh excitation of vehicle electrical system 102 is necessary, for example, from loads or from sources. The other functions, such as the battery-off detection in block 202 and/or the determination of the internal resistance in block 201 run concurrently in battery sensor 10 and may have an influence on the diagnostic result.

Electronic load distribution element 160, 161, 163 has the task of switching off the base load or comfort load circuit 162 with a certain safety objective. In addition, electronic load distribution element 160, 161, 163 is able to take a measurement of the load-circuit currents and communicate it to the energy management. In the voltage prediction or prediction of the corresponding characteristic quantity, it may be assumed that during the execution of a corresponding operating mode SSL for carrying the vehicle over into a safe state, load circuits 162 not absolutely needed may be switched off, thereby increasing the availability.

In the energy management or control unit 190, the characteristic quantity predicted by battery sensor 10 (voltage value U, 199, 74) is converted into a status BN1, BN2 of respective electrical system branch 101, 103 or channel Ch1, Ch2 as a function of selected operating mode SSL. To this end, control unit 190 compares predicted characteristic quantity (U, 74, 199) to suitable voltage thresholds. If predicted characteristic quantity (U, 74, 199) is within permissible limits, control unit 190 generates the enabling of the automated driving functions. In addition, different voltage thresholds are possible for the enabling and in the operational case. The enabling of the automated driving functions may take place, and/or the handover to the driver and/or an operating mode SSL for carrying the vehicle over into a safe state may be triggered, as a function of status information BN1, BN2 of the vehicle electrical system and/or of electrical system branch 101, 103.

What is claimed is:

1. A method for monitoring the supply of power to a motor vehicle having an automated driving function, including different operating modes for bringing the motor vehicle to a dead stop, at least one energy store of the motor vehicle powering at least one load circuit not needed for each of the operating mode and at least one load circuit needed for the operating mode, the method comprising the following steps:
assigning each operating mode of the operating modes, at least one corresponding load profile, which is a function of the load circuit needed for the operating mode and normally occurs during the operating mode;
predicting, for each operating mode of the operating modes, at least one characteristic quantity of the energy store as a function of the corresponding load profile, and enabling the corresponding operating mode and/or the automated driving function, as a function of the predicted characteristic quantity of the energy store;
wherein the predicted characteristic quantity is ascertained as a function of a base load and/or a switching-off potential of the load circuit not needed for the operating mode.

2. The method as recited in claim 1, wherein each of the load profiles is assigned at least one parameter characteristic of the load profile, and the predicted characteristic quantity is ascertained as a function of the parameter.

3. The method as recited in claim 1, wherein for the different operating modes, associated parameters, which are used for ascertaining the predicted characteristic quantity, are ascertained and/or stored.

4. The method as recited in claim 2, wherein at least a time span of a duration of the corresponding operating mode and/or a maximum value of the load profile and/or a time of occurrence of a maximum value of the load profile, is used as the parameter.

5. The method as recited in claim 1, wherein the vehicle electrical system is excited, by activating at least one load circuit and/or at least one source, to ascertain the base load and/or the switching-off potential.

6. The method as recited in claim 1, wherein to ascertain the base load and/or the switching-off potential, certain values are stored and/or ascertained during corresponding activation of the respective load circuit.

7. The method as recited in claim 1, wherein at least one further, predicted, characteristic quantity of at least one further energy store is ascertained in view of a further load profile, which is a function of a further load circuit that is needed for a further operating mode and is powered by a further energy store or electrical system branch.

8. The method as recited in claim 1, wherein different safety-related load circuits of different electrical system branches, which are energized by different energy stores, are powered; in each instance, at least two different ones of the operating modes are provided for each of the electrical system branches; in each instance, respective characteristic quantities are predicted for the at least two different operating modes, and the at least two different operating modes are enabled as a function of the predicted characteristic quantities, and at least for each of the electrical system branches, the base load and/or the switching-off potential are ascertained and taken into consideration in the prediction of the respective characteristic quantities.

9. The method as recited in claim 1, wherein a validity of the predicted characteristic quantity is ascertained as a function of whether the energy store was in a desired operating state and/or whether excitation of the energy store is supposed to occur.

10. The method as recited in claim 1, wherein at least one enabling information item for enabling the corresponding operating mode is generated as a function of the predicted characteristic quantity.

11. The method as recited in claim 1, wherein the predicted characteristic quantity and/or at least one confidence interval and/or at least a validity is evaluated, and at least one load circuit not needed for the corresponding operating mode is switched off as a function of the evaluation.

12. The method as recited in claim 11, wherein the vehicle electrical system is excited as a function of the ascertained confidence interval and/or the validity, by activating at least one load circuit and/or at least one source.

13. The method as recited in claim 1, wherein at least one electronic load distribution element is provided for controlling the load circuits and/or for sensing current of the load circuits.

14. The method as recited in claim 1, wherein the base load of the vehicle electrical system is ascertained at least partially by an electronic load distribution element, by measuring a current flowing through an activated load circuit.

15. The method as recited in claim 2, wherein at least the parameter characteristic of a load profile is stored and/or transmitted to a battery sensor; and the battery sensor ascertains the predicted characteristic quantity as a function of at least one parameter.

* * * * *